United States Patent
Miyazaki et al.

(10) Patent No.: US 10,546,556 B2
(45) Date of Patent: Jan. 28, 2020

(54) COMMUNICATION PATH SPECIFYING DEVICE, HEAD MOUNTED DISPLAY, COMMUNICATION PATH SPECIFYING METHOD, AND PROGRAM

(71) Applicant: SONY INTERACTIVE ENTERTAINMENT INC., Tokyo (JP)

(72) Inventors: Yoshio Miyazaki, Kanagawa (JP); Katsuyoshi Onishi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/776,325

(22) PCT Filed: Dec. 6, 2016

(86) PCT No.: PCT/JP2016/086230
§ 371 (c)(1),
(2) Date: May 15, 2018

(87) PCT Pub. No.: WO2017/099077
PCT Pub. Date: Jun. 15, 2017

(65) Prior Publication Data
US 2018/0357980 A1 Dec. 13, 2018

(30) Foreign Application Priority Data
Dec. 11, 2015 (JP) .................. 2015-242619

(51) Int. Cl.
*H04W 40/02* (2009.01)
*G09G 5/12* (2006.01)
*G06K 9/00* (2006.01)
(52) U.S. Cl.
CPC .......... *G09G 5/12* (2013.01); *G06K 9/00664* (2013.01); *G09G 2370/16* (2013.01); *H04W 40/02* (2013.01)

(58) Field of Classification Search
CPC .... G09G 5/12; G09G 2370/16; H04B 7/0695; H04W 40/02; H04W 40/12; H04W 40/16
See application file for complete search history.

(56) References Cited

U.S. PATENT DOCUMENTS
7,164,932 B1 1/2007 Sato et al.

FOREIGN PATENT DOCUMENTS
JP 11-8893 A 1/1999
JP 11-008896 1/1999
(Continued)

OTHER PUBLICATIONS
Machine translation of JP 2013-051570 (Year: 2019).*
(Continued)

*Primary Examiner* — Michael Pervan
(74) *Attorney, Agent, or Firm* — Katten Muchin Rosenman LLP (57) ABSTRACT

There are provided a communication path specifying device, a head mounted display, a communication path specifying method, and a program each capable of reducing a time required for specifying a communication path having high communication quality. An image acquiring unit (72) acquires an image of an environment where at least either a communication device or a communication partner of the communication device is disposed. A communication path specifying unit (74) specifies a communication path for communication between the communication device and the communication partner on the basis of the image acquired by the image acquiring unit (72), the communication path passing through reflection on a reflection surface.

5 Claims, 9 Drawing Sheets

(56) References Cited

FOREIGN PATENT DOCUMENTS

| | | |
|---|---|---|
| JP | 2000-165959 A | 6/2000 |
| JP | 2013-51570 A | 3/2013 |

OTHER PUBLICATIONS

Machine translation of JP 11-008893 (Year: 2019).*
International Preliminary Report on Patentability dated Jun. 12, 2018, from the corresponding International Application No. PCT/JP2016/086230, 5 sheets.
International Search Report and Written Opinion dated Feb. 28, 2017, from the corresponding International Application No. PCT/JP2016/086230, 6 sheets.

* cited by examiner

| PRIMARY CANDIDATE SECTOR ID | MAIN BEAM ANGLE PARAMETER ($\phi, \theta$) |
|---|---|
| 1 | (−180,+22.5) |
| 2 | (−180,+45) |
| 3 | (−180,+67.5) |
| 4 | (−180,+90) |
| 5 | (−180,+112.5) |
| 6 | (−180,+135) |
| 7 | (−180,+157.5) |
| 8 | (−157.5,+22.5) |
| 9 | (−157.5,+45) |
| 10 | (−157.5,+67.5) |
| 11 | (−157.5,+90) |
| 12 | (−157.5,+112.5) |
| 109 | (+157.5,+90) |
| 110 | (+157.5,+112.5) |
| 111 | (+157.5,+135) |
| 112 | (+157.5,+157.5) |

COMMUNICATION PATH SPECIFYING DEVICE, HEAD MOUNTED DISPLAY, COMMUNICATION PATH SPECIFYING METHOD, AND PROGRAM

TECHNICAL FIELD

The present invention relates to a communication path specifying device, a head mounted display, a communication path specifying method, and a program.

BACKGROUND ART

Communication quality deteriorates when a communication path between a communication device and a communication partner is blocked by a shielding object which shields a radio wave. This deterioration becomes particularly remarkable in wireless communication which utilizes a radio wave traveling with high linearity, such as a millimeter wave.

SUMMARY

Technical Problem

Even when the foregoing deterioration of communication quality occurs, the deteriorated communication quality recovers by switching a communication path currently used for communication to a communication path specified as a path exhibiting high communication quality among communication paths extending in various directions, for example.

However, communication quality needs to be checked for each of the communication paths when specifying the communication path having high communication quality among the communication paths in various directions. Accordingly, a certain length of time is required to specify the communication path having high communication quality.

The present invention has been developed in consideration of the aforementioned circumstances. One of objects of the present invention is to provide a communication path specifying device, a head mounted display, a communication path specifying method, and a program each capable of reducing a time required for specifying a communication path having high communication quality.

Solution to Problem

For solving the aforementioned problem, a communication path specifying device according to the present invention includes: an image acquiring unit that acquires an image of an environment where at least either a communication device or a communication partner of the communication device is disposed; and a communication path specifying unit that specifies a communication path for communication between the communication device and the communication partner on the basis of the image, the communication path passing through reflection on a reflection surface.

According to a mode of the present invention, the communication path specifying unit specifies the communication path when communication quality of communication between the communication device and the communication partner is lower than predetermined quality.

Instead, the communication path specifying unit specifies the communication path when presence of a shielding object that shields a radio wave between the communication device and the communication partner is confirmed.

In addition, a head mounted display according to the present invention includes: an image acquiring unit that acquires an image of an environment where at least either the head mounted display or a communication partner of the head mounted display is disposed; and a communication path specifying unit that specifies a communication path for communication between the head mounted display and the communication partner on the basis of the image, the communication path passing through reflection on a reflection surface.

Further, a communication path specifying method according to the present invention includes: a step of acquiring an image of an environment where at least either a communication device or a communication partner of the communication device is disposed; and a step of specifying a communication path for communication between the communication device and the communication partner on the basis of the image, the communication path passing through reflection on a reflection surface.

Furthermore, a program according to the present invention causes a computer to execute: a procedure for acquiring an image of an environment where at least either a communication device or a communication partner of the communication device is disposed; and a procedure for specifying a communication path for communication between the communication device and the communication partner on the basis of the image, the communication path passing through reflection on a reflection surface.

DESCRIPTION OF EMBODIMENT

An embodiment according to the present invention is hereinafter described with reference to the drawings.

Figure 1:
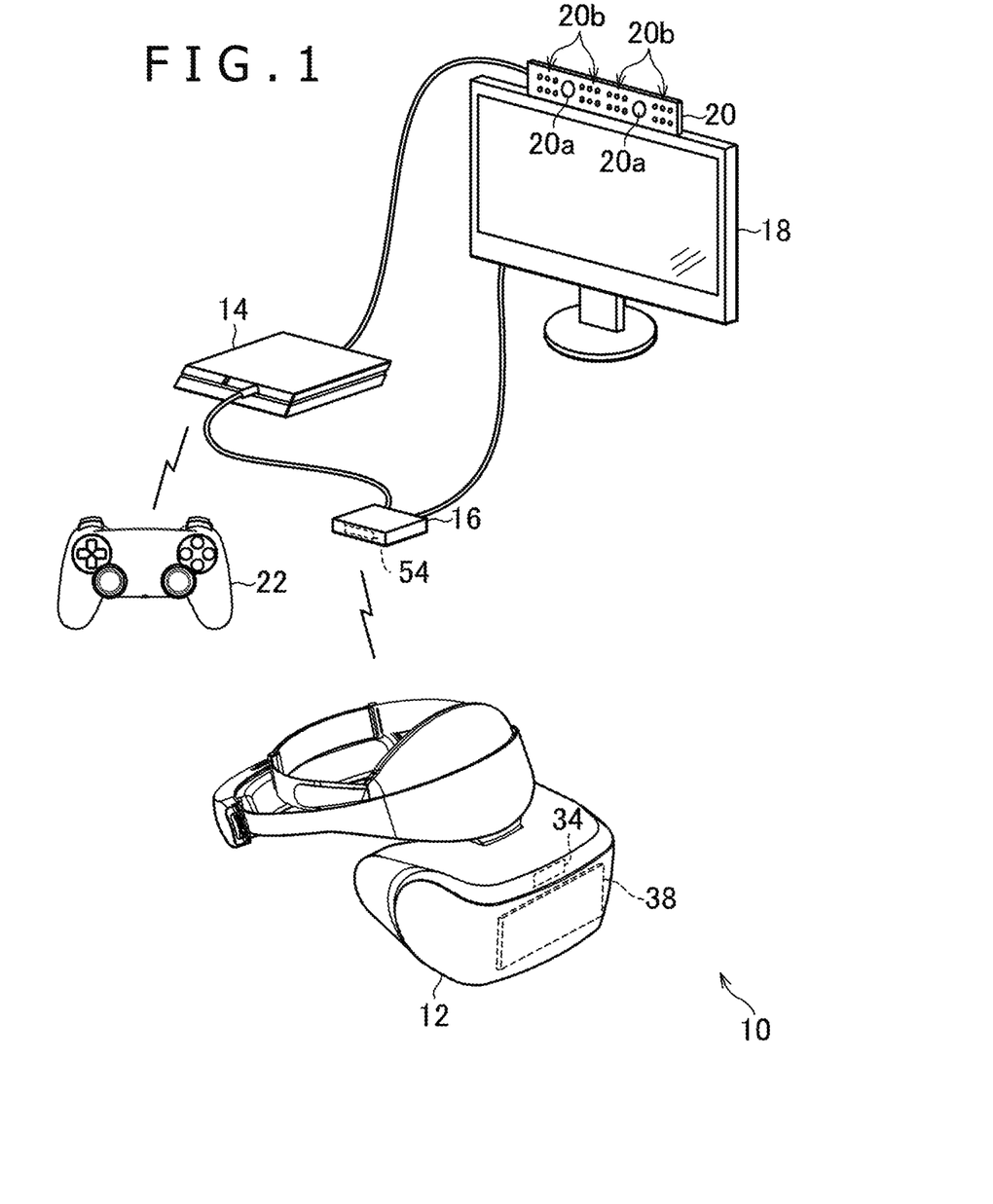
FIG. 1 is a view illustrating an example of an overall configuration of a video display system according to an embodiment of the present invention.
Figure 2A:
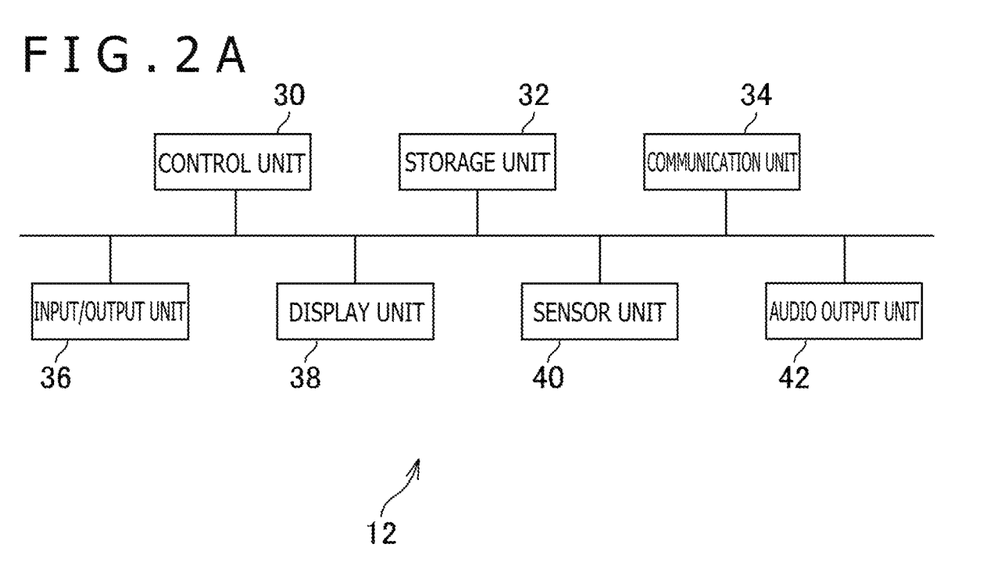
FIG. 2A is a diagram illustrating an example of a configuration of a head mounted display according to the embodiment of the present invention.
Figure 2B:
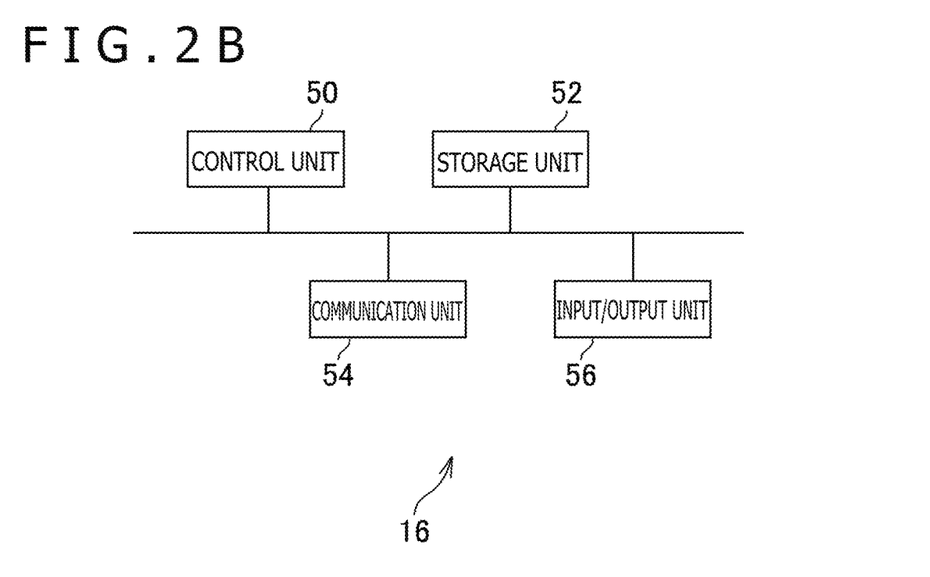
FIG. 2B is a diagram illustrating an example of a configuration of a relay device according to the embodiment of the present invention.

FIG. 1 is a view illustrating an example of an overall configuration of a video display system 10 according to the embodiment of the present invention. FIG. 2A is a diagram illustrating an example of a configuration of a head mounted display (HMD) 12 according to the present embodiment. FIG. 2B is a diagram illustrating an example of a configuration of a relay device 16 according to the present embodiment.

As illustrated in FIG. 1, the video display system 10 according to the present embodiment includes the HMD 12, an entertainment device 14, the relay device 16, a display 18, a camera microphone unit 20, and a controller 22.

For example, the HMD 12 according to the present embodiment includes a control unit 30, a storage unit 32, a communication unit 34, an input/output unit 36, a display unit 38, a sensor unit 40, and an audio output unit 42, as illustrated in FIG. 2A.

The control unit 30 is a program control device, such as a microprocessor, which operates according to programs installed in the HMD 12, for example.

The storage unit 32 is a storage element such as a read only memory (ROM) and a random access memory (RAM), for example. The storage unit 32 stores programs executed by the control unit 30, for example.

The communication unit 34 is a communication interface, such as a wireless local area network (LAN) module, which includes an array antenna, for example. According to the present embodiment, the communication unit 34 is disposed in an upper front region of the HMD 12 as illustrated in FIG. 1.

The input/output unit 36 is an input/output port such as a high-definition multimedia interface (HDMI) (registered trademark) port, a universal serial bus (USB) port, and an auxiliary (AUX) port, for example.

The display unit 38 is a display, such as a liquid crystal display and an organic electroluminescence (EL) display, for example, which is disposed on the front side of the HMD 12 to display a video or the like generated by the entertainment device 14. The display unit 38 is housed in a housing of the HMD 12. The display unit 38 may receive a video signal output from the entertainment device 14 and relayed by the relay device 16, and output a video indicated by the video signal, for example. The display unit 38 according to the present embodiment is configured to display an image for a left eye and an image for a right eye to display a three-dimensional image, for example. However, the display unit 38 may be a unit which does not display a three-dimensional image but only displays a two-dimensional image.

The sensor unit 40 is a sensor such as an acceleration sensor and a motion sensor, for example. The sensor unit 40 outputs a rotation amount, a shift amount, and other results of measurement of the HMD 12 to the control unit 30 at a predetermined frame rate.

The audio output unit 42 is constituted by a headphone, a speaker or the like, and outputs a voice or the like indicated by audio data generated by the entertainment device 14. The audio output unit 42 receives an audio signal output from the entertainment device 14 and relayed by the relay device 16, and outputs a voice indicated by the audio signal, for example.

The entertainment device 14 according to the present embodiment is a computer such as a game console, a digital versatile disk (DVD) player, and a Blu-ray (registered trademark) player, for example. The entertainment device 14 according to the present embodiment executes stored game programs or reproduces content recorded in an optical disk to generate a video and a voice, for example. The entertainment device 14 according to the present embodiment outputs a video signal indicating the generated video and an audio signal indicating the generated voice to the HMD 12 and the display 18 via the relay device 16.

The relay device 16 according to the present embodiment is a computer which relays a video signal and an audio signal output from the entertainment device 14, and outputs the video signal and the audio signal to the HMD 12 and the display 18.

The relay device 16 according to the present embodiment includes a control unit 50, a storage unit 52, a communication unit 54, and an input/output unit 56 as illustrated in FIG. 2B, for example.

The control unit 50 is a program control device, such as a central processing unit (CPU), which operates according to a control circuit, or programs installed in the relay device 16, for example.

The storage unit 52 is a storage element such as a ROM and a RAM, for example. The storage unit 52 stores programs executed by the control unit 50, for example.

The communication unit 54 is a communication interface, such as a wireless LAN module, which includes an array antenna, for example. According to the present embodiment, the communication unit 54 is included on the front side of the relay device 16 as illustrated in FIG. 1.

The input/output unit 56 is an input/output port such as an HDMI (registered trademark) port and a USB port.

The display 18 according to the present embodiment is a liquid crystal display, for example, which displays a video or the like indicated by a video signal output from the entertainment device 14.

For example, the camera microphone unit 20 according to the present embodiment includes a camera 20a which captures an image of an object and outputs the image to the entertainment device 14, and a microphone 20b which acquires a voice around the microphone 20b, converts the voice into audio data, and outputs the audio data to the entertainment device 14. The camera 20a according to the present embodiment is a stereo camera.

The HMD 12 and the relay device 16 are capable of transmitting and receiving data to and from each other via wireless communication, for example. The entertainment device 14 and the relay device 16 are connected via an HDMI cable, a USB cable or the like, for example. The relay device 16 and the display 18 are connected via an HDMI cable or the like, for example. The entertainment device 14 and the camera microphone unit 20 are connected via an AUX cable or the like, for example.

The controller 22 according to the present embodiment is an operation input device operated to input an operation to the entertainment device 14. A user presses a direction key or a button provided on the controller 22, or tilts an operation stick to input various types of operations using the controller 22. The controller 22 according to the present embodiment outputs input data associated with operation input to the entertainment device 14. The controller 22 according to the present embodiment further includes a USB port. The controller 22 is therefore capable of being connected with the entertainment device 14 via a USB cable, and outputting input data to the entertainment device 14 by wire. The controller 22 according to the present embodiment further includes a wireless communication module or the like to wirelessly output input data to the entertainment device 14 as well.

Figure 3A:
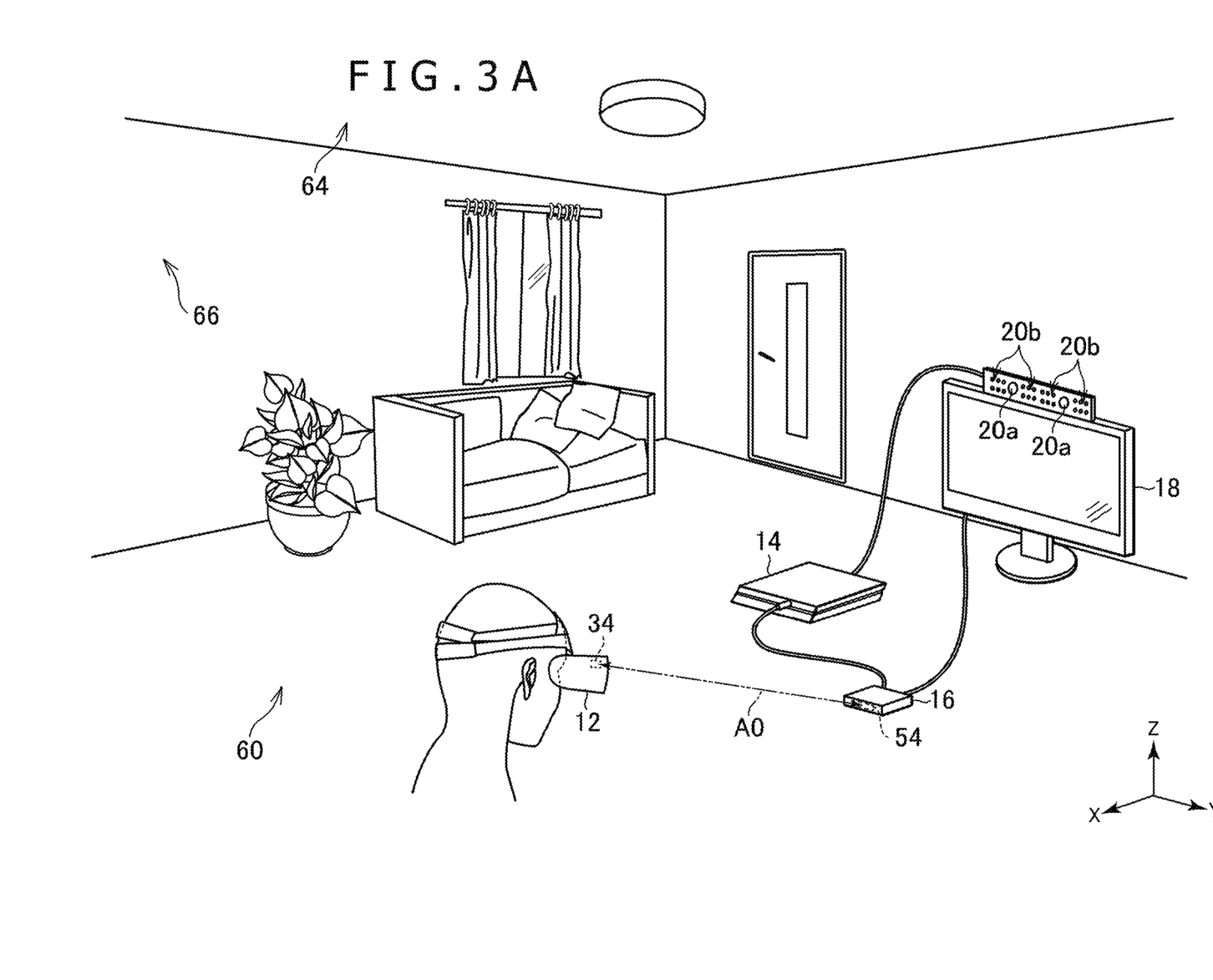
FIG. 3A is a view schematically illustrating an example of a situation where the video display system according to the present embodiment is disposed in a room.
Figure 3B:
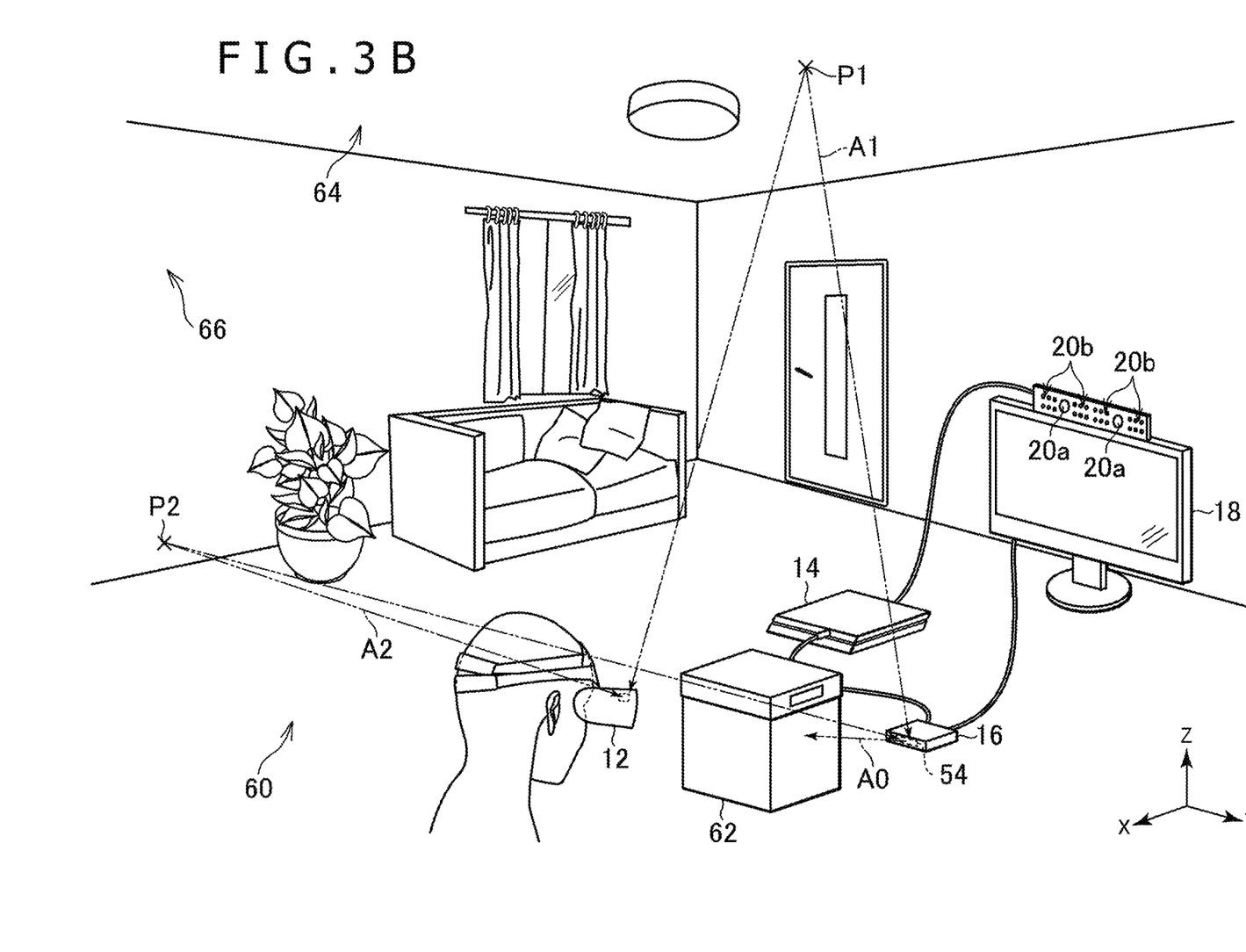
FIG. 3B is a view schematically illustrating an example of a situation where the video display system according to the present embodiment is disposed in the room.

FIGS. 3A and 3B are views each schematically illustrating an example of a situation where the video display system 10 according to the present embodiment is disposed in a room 60. As illustrated in FIG. 3A, various objects such as a sofa, a vase, curtains, and a light are arranged in the room where the video display system 10 is disposed. It is assumed that the HMD 12 communicates with the relay device 16 via a communication path A0 which extends along a straight line connecting the HMD 12 and the relay device 16 in the situation illustrated in FIG. 3A. It is further assumed according to the present embodiment that the HMD 12 and the relay device 16 perform wireless communication with each other using a millimeter wave in a frequency band such as 60 GHz.

Suppose herein that a shielding object 62 which does not transmit radio waves, such as a metal storage box, is disposed on the communication path between the HMD 12 and the relay device 16 as illustrated in FIG. 3B, for example. In this case, communication quality of communication between the HMD 12 and the relay device 16 deteriorates. Examples of communication quality according to the present embodiment include a signal to noise ratio (S/N ratio), and reception intensity.

In this case, the communication path A0 for communication between the HMD 12 and the relay device 16 according to the present embodiment is switched to a communication path which passes through reflection on a reflection surface such as a ceiling 64 and a wall 66 as illustrated in FIG. 3B, for example. FIG. 3B illustrates a communication path A1 taking the ceiling 64 as the reflection surface, and a communication path A2 taking the wall 66 with a window disposed thereon as the reflection surface. FIG. 3B also illustrates a position P1 of a point on the ceiling 64 at which point a radio wave reflects during communication along the communication path A1. FIG. 3B further illustrates a position P2 of a point on the wall 66 at which point a radio wave reflects during communication along the communication path A2.

Millimeter waves in a frequency band such as 60 GHz travel with high linearity. Accordingly, sufficient communication quality may be difficult to secure unless a communication path is appropriately adjusted. According to the present embodiment, communication quality is securable by the foregoing adjustment such that a communication path which is not shielded by the shielding object 62 and passes through reflection on the reflection surface is used for communication between the HMD 12 and the relay device 16.

A main beam direction of the relay device 16 is set on the basis of the communication path adjusted in the manner described above. Beam forming is known as an example of a technology which sets a main beam direction. Beam forming is constituted by a sector level sweep process and a beam refinement process. In sector level sweep, a direction exhibiting high communication quality during communication is determined as a main beam direction of the relay device 16 from among a plurality of candidates for a main beam direction. When the main beam direction of the relay device 16 is determined by sector level sweep, the beam refinement process is subsequently executed for fine adjustment of the determined main beam direction of the relay device 16. Both sector level sweep and beam refinement are performed through communication (negotiation) between the communication unit 34 of the HMD 12 and the communication unit 54 of the relay device 16.

Figure 4:
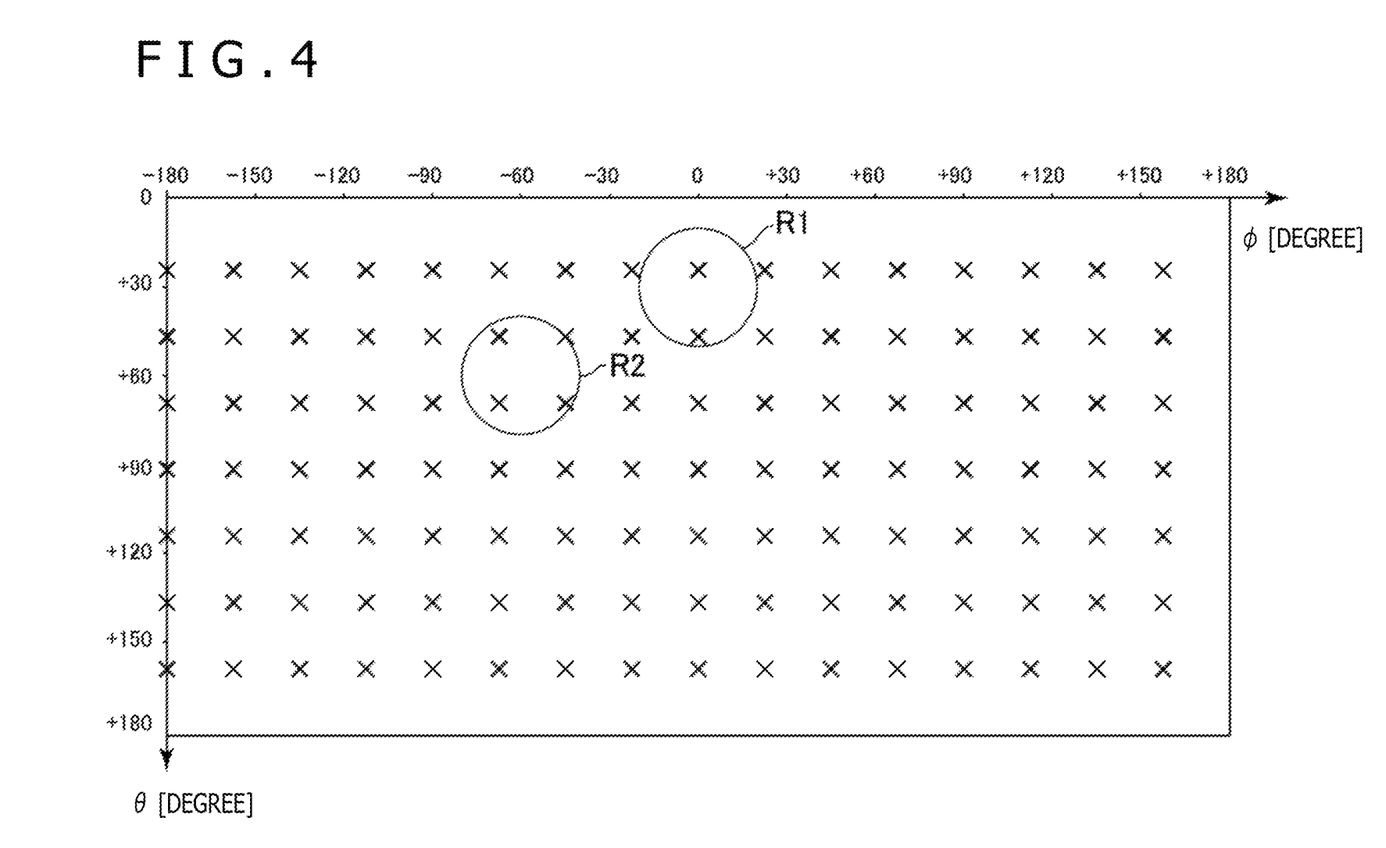
FIG. 4 is a sector candidate diagram schematically illustrating an example of a plurality of candidates for a main beam direction of sector level sweep.
Figure 5:
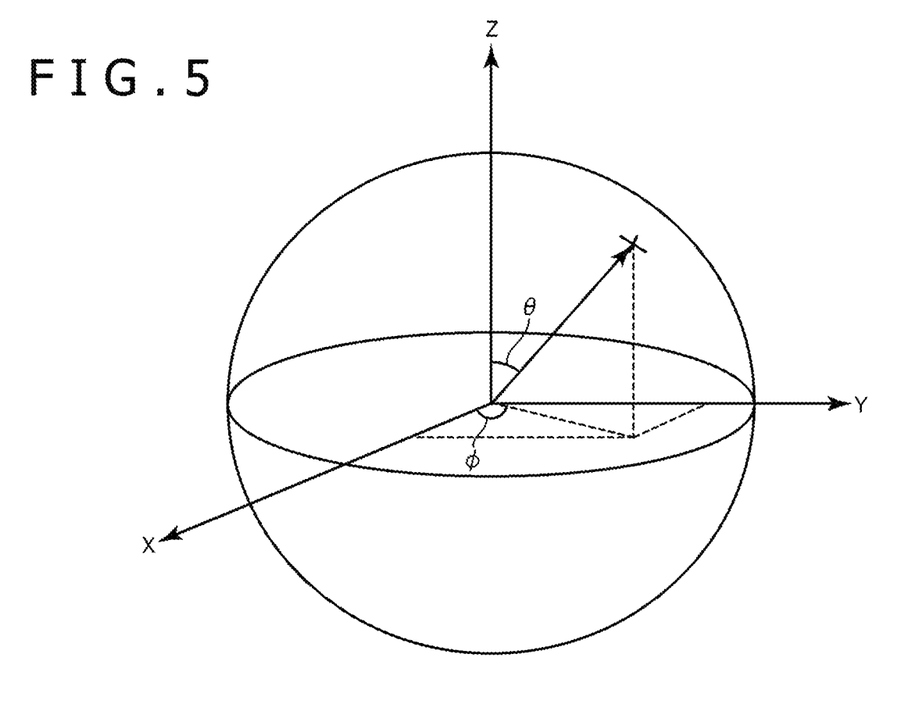
FIG. 5 is an explanatory view explaining an example of correspondence between the main beam direction and a combination of an angle φ and an angle θ in the sector candidate diagram.

FIG. 4 is a sector candidate diagram schematically illustrating an example of a plurality of candidates for a main beam direction in sector level sweep. FIG. 5 is an explanatory view explaining an example of correspondence between a main beam direction and a combination of an angle $\phi$ and an angle $\theta$ in the sector candidate diagram illustrated in FIG. 4.

Each of points represented by marks "x" in the sector candidate diagram illustrated in FIG. 4 indicates a candidate of the main beam direction in sector level sweep. Each of these candidates is hereinafter referred to as a primary candidate sector. According to the example illustrated in FIG. 4, 112 primary candidate sectors are set. Each of these primary candidate sectors is associated with a combination of the angle $\phi$ and the angle $\theta$. The combination of the angle $\phi$ and the angle $\theta$ is hereinafter referred to as a main beam angle parameter ($\phi$, $\theta$).

According to the present embodiment, it is assumed that an X-axis positive direction in FIG. 5 corresponds to a direction that is perpendicular to a plane where the array antenna included in the relay device 16 is disposed and that extends from the rear to the front of the relay device 16, for example. As illustrated in FIGS. 3A and 3B, the relay device 16 is so disposed that the front side of the relay device 16 faces the HMD 12. It is also assumed that a Y-axis positive direction in FIG. 5 corresponds to a direction that extends along the plane where the array antenna included in the relay device 16 is disposed and that extends from the right to the left of the relay device 16 (substantially a direction from left to right in FIGS. 3A and 3B). It is also assumed that a Z-axis positive direction corresponds to a direction that extends along the plane where the array antenna included in the relay device 16 is disposed and that rotates anticlockwise by 90 degrees from the Y-axis positive direction as viewed in the X-axis positive direction. According to the present embodiment, it is assumed that the angle $\phi$ is an angle which has a positive value in the anticlockwise direction with respect to the X axis as viewed in the Z-axis positive direction as illustrated in FIG. 5. It is also assumed that the angle $\theta$ is an angle formed with respect to the Z-axis positive direction. For example, a main beam angle parameter ($\phi$, $\theta$) corresponding to the X-axis positive direction is expressed as (0, +90). According to the present embodiment, it is assumed that each value of main beam angle parameters is expressed in units of "degree." According to the present embodiment, it is assumed that a range of $\phi$ is defined as $-180 \leq \phi < +180$, and a range of $\theta$ is defined as $0 \leq \theta \leq 180$.

According to conventional sector level sweep, negotiation between the HMD 12 and the relay device 16 is performed. In this negotiation, communication quality in communication which adopts, as a main beam direction, a direction associated with a primary candidate sector is checked for each of all 112 primary candidate sectors disposed in a sector candidate diagram. The direction associated with the primary candidate sector exhibiting the highest communication quality is determined as a main beam direction.

According to the present embodiment, however, a communication path which passes through a reflection surface is specified on the basis of an image captured by the camera 20a. Thereafter, a part of primary candidate sectors associated with the specified communication path are selected as secondary candidate sectors from among the 112 primary candidate sectors disposed in the sector candidate diagram illustrated in FIG. 4. For selecting the secondary candidate sectors, no communication (negotiation) is required between the HMD 12 and the relay device 16. According to the present embodiment, communication quality in communication which adopts, as a main beam direction, a direction associated with a secondary candidate sector is checked in negotiation for each of selected all secondary candidate sectors. The direction associated with the secondary candidate sector exhibiting the highest communication quality is determined as a main beam direction.

FIG. 4 illustrates two examples of narrowed regions R (R1 and R2) each defining a boundary between a secondary candidate sector and not a secondary candidate sector.

According to the present embodiment, it is assumed that a communication path is blocked by the shielding object 62 during communication in a main beam direction associated with a value (0, +60) of the main beam angle parameter (ϕ, θ), for example.

According to the present embodiment, each of the communication path A1 and the communication path A2 passing through reflection surfaces is specified on the basis of an image captured by the camera 20a. Subsequently specified is a value of the main beam angle parameter (ϕ, θ) associated with the main beam direction of the HMD 12 during communication along each of the communication path A1 and the communication path A2. It is assumed herein that a value (0, +30) is specified as a value of the main beam angle parameter (ϕ, θ) associated with the communication path A1, and that a value (−60, +60) is specified as a value of the main beam angle parameter (ϕ, θ) associated with the communication path A2.

Thereafter, the region R1 associated with the communication path A1, and the region R2 associated with the communication path A2 are specified as the narrowed regions R in the sector candidate diagram illustrated in FIG. 4. For example, a circular region whose radius has a length corresponding to a predetermined angle (e.g., 20 degrees herein) with a point corresponding to the main beam angle parameter (ϕ, θ)=(0, +30) as a center is specified herein as the region R1 associated with the communication path A1. On the other hand, a circular region whose radius has a length corresponding to a predetermined angle (e.g., 20 degrees herein) with a point corresponding to a main beam angle parameter (ϕ, θ)=(−60, +60) as a center is specified herein as the region R2 associated with the communication path A2.

When the region R1 is specified as a narrowed region R, two sectors within the region R1 are selected as secondary candidate sectors from among the 112 primary candidate sectors. When the region R2 is specified as a narrowed region R, three sectors within the region R1 are selected as secondary candidate sectors from among the 112 primary candidate sectors.

For a narrowed region R which has a value θ larger than +180, parallel displacement by 180 is made in the ϕ-axis positive direction in the sector candidate diagram after subjected to vertical inversion. For a narrowed region R which has a value θ smaller than 0, parallel displacement by 180 is made in the ϕ-axis positive direction in the sector candidate diagram after subjected to vertical inversion. For a narrowed region R which has a value ϕ larger than +180, parallel displacement by 360 is made in the ϕ-axis negative direction in the sector candidate diagram. For a narrowed region R which has a value ϕ smaller than −180, parallel displacement by 360 is made in the ϕ-axis positive direction in the sector candidate diagram. In the foregoing cases, the one narrowed region R is separated into two or more regions and disposed in the sector candidate diagram.

The video display system 10 according to the present embodiment includes the camera 20a, and therefore is capable of capturing an image of an environment where at least either the HMD 12 or the relay device 16 is disposed. Subsequently, a communication path which passes through reflection on a reflection surface for communication between the HMD 12 and the relay device 16 is specified on the basis of the captured image. According to the present embodiment, candidates of a main beam direction as targets of communication quality check in the manner described above are limited to candidates close to a main beam direction associated with a communication path which passes through reflection on a reflection surface for communication between the HMD 12 and the relay device 16. According to the present embodiment, therefore, the number of sectors as targets of communication quality check by negotiation between the HMD 12 and the relay device 16 is smaller than the number of sectors in conventional beam forming. In this case, a main beam direction is specified in a shorter time in the present embodiment than in conventional beam forming. Accordingly, a communication path exhibiting high communication quality is specified in a shorter time in the present embodiment than in conventional beam forming.

A function of the relay device 16 according to the present embodiment, and processing executed by the relay device 16 according to the present embodiment are hereinafter further described. The relay device 16 according to the present embodiment plays a role as a communication path specifying device which specifies a communication path passing through reflection on a reflection surface for communication between the HMD 12 and the relay device 16.

Figure 6:
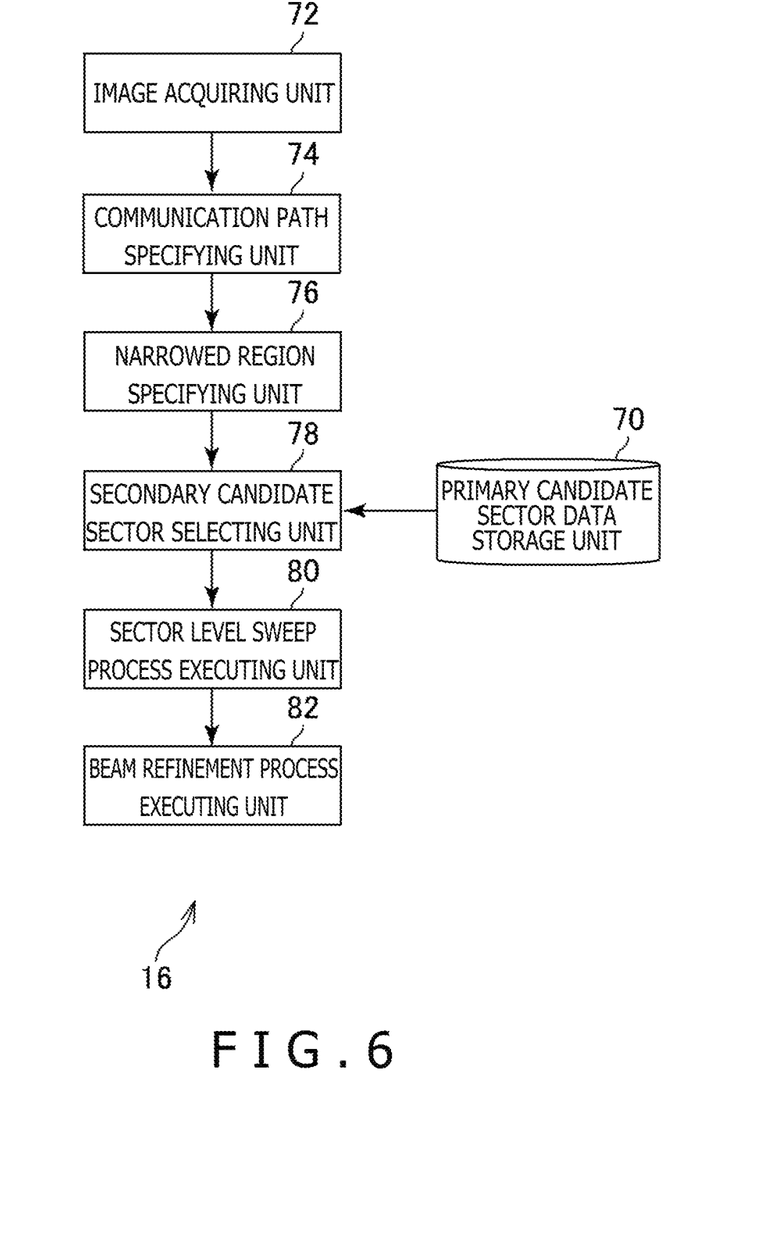
FIG. 6 is a functional block diagram illustrating an example of functions implemented in the relay device according to the embodiment of the present invention.

FIG. 6 is a functional block diagram illustrating an example of functions implemented in the relay device 16 according to the present embodiment. The relay device 16 according to the present embodiment need not implement all of the functions illustrated in FIG. 6, or may implement other functions than the functions illustrated in FIG. 6.

As illustrated in FIG. 6, the relay device 16 according to the present embodiment includes, in view of functions, a primary candidate sector data storage unit 70, an image acquiring unit 72, a communication path specifying unit 74, a narrowed region specifying unit 76, a secondary candidate sector selecting unit 78, a sector level sweep process executing unit 80, and a beam refinement process executing unit 82, for example. The primary candidate sector data storage unit 70 is implemented with the storage unit 52 as a main. The image acquiring unit 72 is implemented with the control unit 50 and the input/output unit 56 as a main. The communication path specifying unit 74 is implemented with the control unit 50 as a main. The sector level sweep process executing unit 80 and the beam refinement process executing unit 82 are each implemented with the control unit 50 and the communication unit 54 as a main.

The foregoing functions may be implemented by executing a program by the control unit 50, the program being installed in the relay device 16 as a computer, and including commands corresponding to the foregoing functions. This program is supplied to the relay device 16 via a computer-readable information storage medium, such as an optical disk, a magnetic disk, a magnetic tape, a magneto-optical disk, and a flash memory, or via the Internet.

Figure 7:
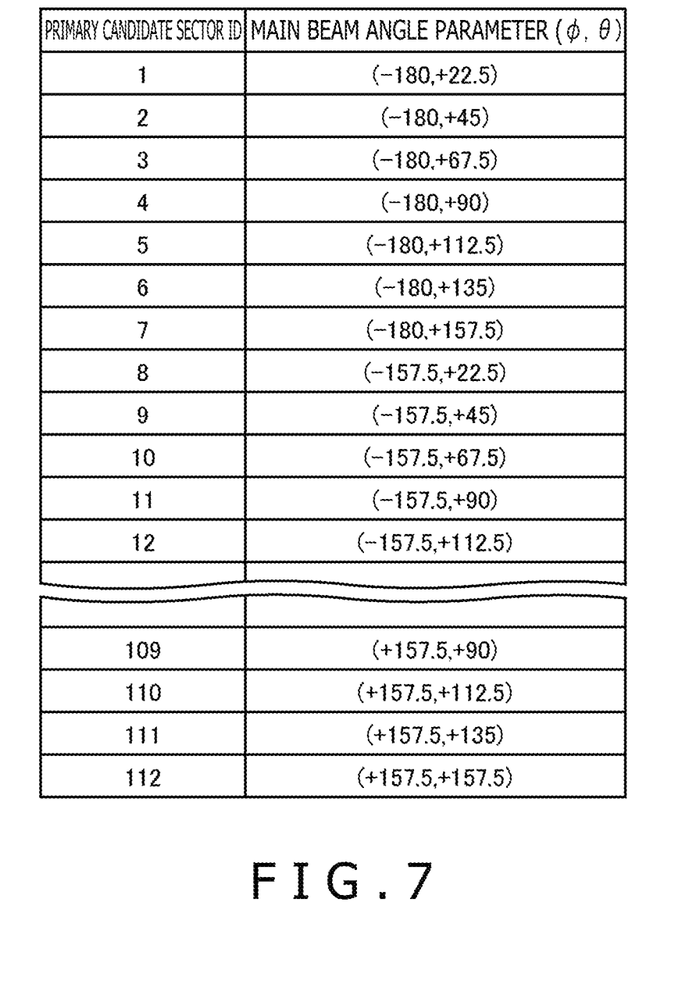
FIG. 7 is a table illustrating an example of primary candidate sector data.

The primary candidate sector data storage unit 70 according to the present embodiment stores primary candidate sector data indicating a primary candidate sector, for example. As illustrated in FIG. 7, the primary candidate sector data according to the present embodiment includes a primary candidate sector identification (ID) as identification information regarding the primary candidate sector data, and the main beam angle parameter (ϕ, θ) described above, for example. The primary candidate sector data storage unit 70 according to the present embodiment stores a plurality of items of the primary candidate sector data as illustrated in FIG. 7. The primary candidate sector indicated by the primary candidate sector data is associated with an angle with respect to a reference direction (e.g., X-axis positive direction) by using the main beam angle parameter ($\phi\theta$).

The image acquiring unit 72 according to the present embodiment acquires an image of an environment where at least either a communication device (e.g., relay device 16 herein), and a communication partner of the communication device (e.g., HMD 12 herein) is disposed, for example. When the camera 20a captures an image indicating a situation of the room 60 at a predetermined frame rate, the image acquiring unit 72 acquires the image at the corresponding frame rate, for example.

The communication path specifying unit 74 according to the present embodiment specifies a communication path for communication between the communication device (e.g., relay device 16 herein) and the communication partner (e.g., HMD 12 herein) on the basis of the image acquired by the image acquiring unit 72, for example. The communication path specifying unit 74 herein may specify a communication path which passes through reflection on a reflection surface for communication between the relay device 16 and the HMD 12. The communication path specifying unit 74 may specify a communication path when communication quality of communication between the relay device 16 and the HMD 12 becomes lower than predetermined quality. The communication path specifying unit 74 may specify a communication path when presence of the shielding object 62 shielding a radio wave between the relay device 16 and the HMD 12 is confirmed. The communication path specifying unit 74 may specify either a single or a plurality of communication paths.

For example, the communication path specifying unit 74 specifies a position of a reflection surface by using a known image recognition technology on the basis of an image acquired by the image acquiring unit 72. The communication path specifying unit 74 subsequently specifies a communication path which passes through reflection on the reflection surface and connects the relay device 16 and the HMD 12 (e.g., communication path A1 and communication path A2 in FIG. 3B), for example. Specified herein may be a position of such a point on the reflection surface at which point an incident angle and a reflection angle of a radio wave are equal to each other during communication (e.g., position of point P1 or position of point P2 in FIG. 3B), for example. In this case, the communication path specifying unit 74 may specify a main beam angle parameter ($\phi$, $\theta$) indicating a direction toward the position of the specified point as viewed from the communication unit 54 of the relay device 16. The main beam angle parameter ($\phi$, $\theta$) specified in this manner is hereinafter referred to as a main beam center angle parameter ($\phi c$, $\theta c$).

The narrowed region specifying unit 76 according to the present embodiment specifies the narrowed region R on the basis of the communication path specified by the communication path specifying unit 74, for example. The narrowed region specifying unit 76 specifies, as the narrowed region R, a circular region whose radius has a length corresponding to a predetermined angle (e.g., 20 degrees) with a point corresponding to a main beam center angle parameter ($\phi c$, $\theta c$) specified by the communication path specifying unit 74 as a center in the sector candidate diagram, for example.

The secondary candidate sector selecting unit 78 selects secondary candidate sectors from among primary candidate sectors indicated by primary candidate sector data. The secondary candidate sector selecting unit 78 according to the present embodiment selects, as secondary candidate sector data indicating secondary candidate sectors, primary candidate sector data within an angle range in the narrowed region R specified by the narrowed region specifying unit 76, for example. More specifically, primary candidate sector data including a main beam angle parameter ($\phi$, $\theta$) which meets a condition of $((\phi-\phi c)^2+(\theta-\theta c)^2)^{1/2}<=20$ is selected as secondary candidate sector data indicating secondary candidate sectors, for example. In this manner, the secondary candidate sector selecting unit 78 may select, as secondary candidate sectors, primary candidate sectors whose associated angles lie within an angle range corresponding to the posture of the HMD 12. In the selection process of the secondary candidate performed by the secondary candidate sector selecting unit 78, no communication (negotiation) is required between the HMD 12 and the relay device 16.

The sector level sweep process executing unit 80 according to the present embodiment determines a main beam direction of the relay device 16 on the basis of each communication quality of communication which adopts, as main beam directions, the respective directions of secondary candidate sectors selected by the secondary candidate sector selecting unit 78, for example. The sector level sweep process executing unit 80 according to the present embodiment checks each communication quality of communication which adopts, as main beam directions, the respective directions of secondary candidate sectors selected by the secondary candidate sector selecting unit 78 through negotiation between the HMD 12 and the relay device 16, for example. The sector level sweep process executing unit 80 subsequently determines a main beam direction exhibiting the highest communication quality as the main beam direction of the relay device 16, for example.

The beam refinement process executing unit 82 executes a beam refinement process for fine adjustment of the main beam direction determined by the sector level sweep process executing unit 80. The beam refinement process is also performed through communication (negotiation) between the HMD 12 and the relay device 16.

Figure 8:
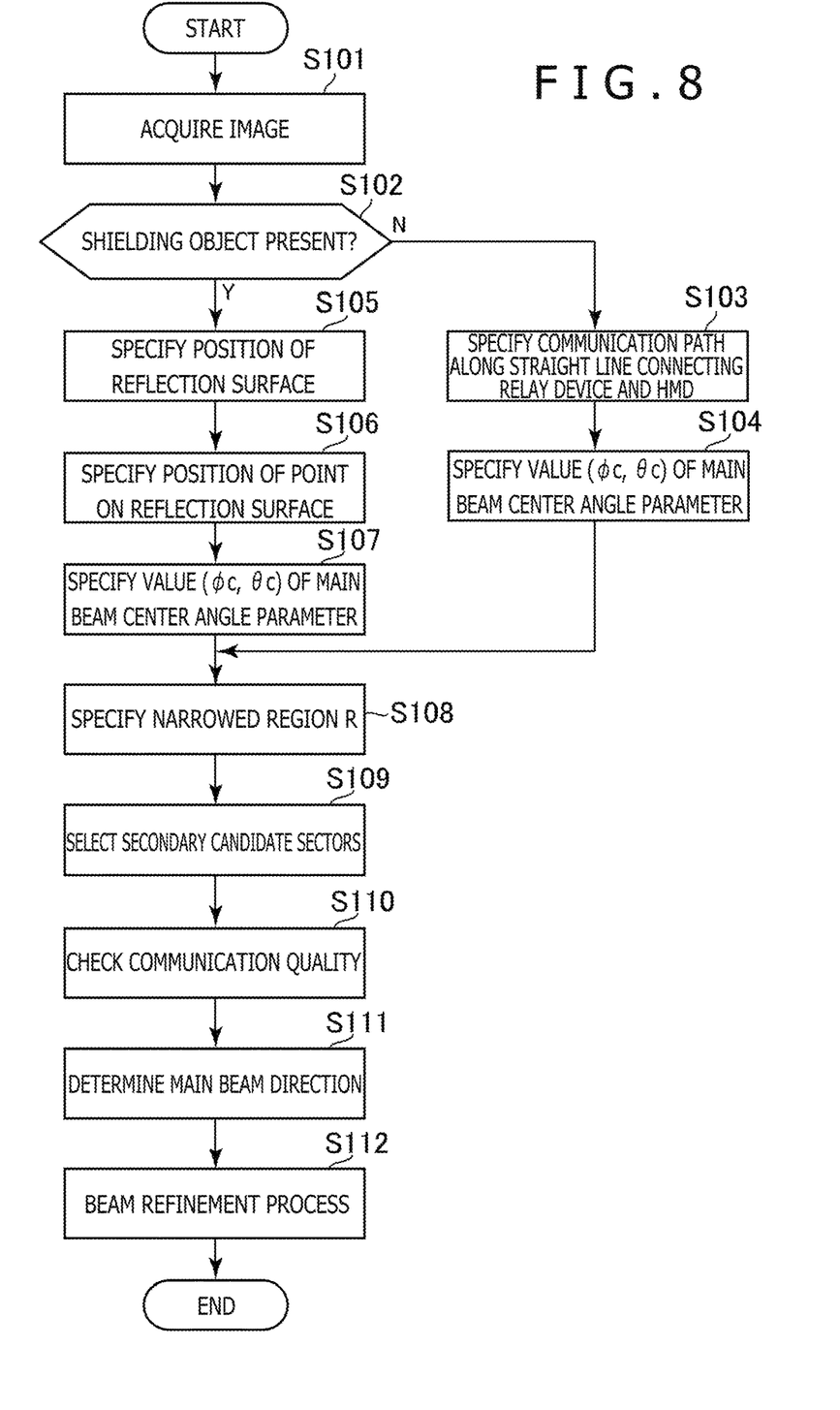
FIG. 8 is a flowchart illustrating an example of a flow of processing performed in the head mounted display according to the embodiment of the present invention.

An example of a flow of processing performed in the HMD 12 according to the present embodiment is hereinafter described with reference to a flowchart illustrated in FIG. 8.

Initially, the image acquiring unit 72 acquires an image captured by the camera 20a (S101). Subsequently, the communication path specifying unit 74 checks whether or not the shielding object 62 shielding a radio wave is present between the relay device 16 and the HMD 12 on the basis of the image acquired in the processing depicted in S101 (S102). When the presence of the shielding object 62 shielding a radio wave is not confirmed herein (S102: N), the communication path specifying unit 74 specifies a communication path (e.g., communication path A0) along a straight line connecting the relay device 16 and the HMD 12 (S103). Thereafter, the communication path specifying unit 74 specifies a value of a main beam center angle parameter ($\phi c$, $\theta c$) indicating the direction of the communication path specified in the processing depicted in S103 (S104).

When the presence of the shielding object 62 shielding a radio wave is confirmed in the processing depicted in S102 (S102: Y), the communication path specifying unit 74 specifies a position of a reflection surface (e.g., ceiling 64 or wall 66) on the basis of the image acquired in the processing depicted in S101 (S105). Subsequently, the communication path specifying unit 74 specifies a position of a point (e.g., position of point P1 or point P2) on the reflection surface which point is specified in the processing depicted in S104 and at which point an incident angle and a reflection angle of a radio wave are equal to each other during communication (S106).

Thereafter, the communication path specifying unit 74 specifies a main beam center angle parameter (φc, θc) indicating a direction toward the position of the point specified in the processing depicted in S106 as viewed from the communication unit 54 of the relay device 16 (S107). In the processing depicted in S107, either one or a plurality of the main beam center angle parameters (φc, θc) may be specified. For example, both the communication path A1 and the communication path A2 illustrated in FIG. 3B may be specified.

The narrowed region specifying unit 76 subsequently specifies, as the narrowed region R, a circular region whose radius has a length corresponding to a predetermined angle (e.g., 20 degrees) with a point corresponding to the main beam center angle parameter (φc, θc) specified in the processing depicted in S104 or S107 as a center (S108). For example, the region R1 and the region R2 within the sector candidate diagram illustrated in FIG. 4 are specified.

Thereafter, the secondary candidate sector selecting unit 78 selects primary candidate sectors within the narrowed region R as secondary candidate sectors (S109). For example, selected herein as secondary candidate sector data indicating secondary candidate sectors is primary candidate sector data including a main beam angle parameter (φ, θ) which meets a condition of $((\varphi-\varphi c)^2+(\theta-\theta c)^2)^{1/2}<=40$. When a plurality of the narrowed regions R are specified herein, primary candidate sectors within any one of the narrowed regions R may be selected as secondary candidate sectors.

The sector level sweep process executing unit 80 subsequently checks each communication quality of communication in a main beam direction represented by a secondary candidate sector for all the secondary candidate sectors specified in the processing depicted in S109 (S110).

Thereafter, the sector level sweep process executing unit 80 determines, as a main beam direction of the relay device 16, a main beam direction represented by the secondary candidate sector specified as a secondary candidate sector exhibiting the highest communication quality in the processing depicted in S110 (S111).

The beam refinement process executing unit 82 subsequently performs the beam refinement process for fine adjustment of the main beam direction determined in the processing depicted in S111 (S112). Then, processing included in the present process example ends.

As described above, no negotiation between the HMD 12 and the relay device 16 is performed in the processing depicted in S101 to S109, while negotiation between the HMD 12 and the relay device 16 is performed in the processing depicted in S110 to S112.

Execution of the processing depicted in S101 to S112 may be repeated after completion of the processing depicted in S112.

For example, the communication path specifying unit 74 may monitor communication quality between the HMD 12 and the relay device 16. In this case, the processing depicted in S101 to S112 may be executed when the communication quality is lower than predetermined quality.

For example, the communication path specifying unit 74 may monitor the presence or absence of the shielding object 62 on the basis of an image captured by the camera 20a and generated at a predetermined frame rate. In this case, the processing depicted in S105 to S112 may be executed when the presence of the shielding object 62 between the relay device 16 and the HMD 12 is confirmed.

The communication path specifying unit 74 may specify a communication path which passes along a straight line connecting the relay device 16 and the HMD 12, as well as a communication path which passes through reflection on a reflection surface for communication between the relay device 16 and the HMD 12. For example, the communication path specifying unit 74 may specify the communication path A0 as well as the communication path A1 and the communication path A2. In this case, the narrowed region R associated with the corresponding one of the communication paths may be specified. Thereafter, primary candidate sectors within any one of the narrowed regions R may be selected as secondary candidate sectors.

The communication path specifying unit 74 may evaluate communication quality of each communication path on the basis of an image acquired by the image acquiring unit 72 when a plurality of communication paths each passing through reflection on a reflection surface for communication between the relay device 16 and the HMD 12 are specified. In this case, an appropriate communication path may be selected from among the respective communication paths on the basis of a result of the evaluation.

For example, the communication path specifying unit 74 may specify a material of the point specified in the processing depicted in S106 described above by utilizing a known image recognition technology. According to the example illustrated in FIGS. 3A and 3B, materials such as cloth, glass, leather, and pottery may be specified. In this case, a communication path associated with a material having the smallest return loss may be selected, for example.

The communication path specifying unit 74 may specify a type of object including the point specified in the processing depicted in S106 described above by utilizing a known image recognition technology. According to the example illustrated in FIGS. 3A and 3B, types of object such as a curtain, a window, a sofa, and a flowerpot may be specified, for example. In this case, a communication path associated with a type of object having the smallest return loss may be selected, for example.

In the foregoing cases, primary candidate sectors within the narrowed region R associated with the selected communication path are selected as secondary candidate sectors. Suppose that positions of the point P1 and the point P2 are specified in the processing depicted in S106 illustrated in FIG. 8, for example. When the return loss at the point P1 is smaller than the return loss at the point P2, only a main beam center angle parameter (φc, θc) indicating a direction toward the position of the point P1 as viewed from the communication unit 54 of the relay device 16 may be specified in the processing depicted in S107.

Data indicating a relationship between return losses and materials and types of object may be stored in the relay device 16 beforehand to specify the material or the type of object having the smallest return loss on the basis of the data, for example.

The relay device 16 may learn a relationship between materials and return losses on the basis of communication quality of actual communication, for example. In this case, a communication path associated with a material having the smallest return loss may be selected on the basis of a result of learning.

For example, the radius of the narrowed region R may not have a length corresponding to 20 degrees. In addition, the narrowed region R is not required to be circular. For example, a space where the relay device 16 and the HMD 12 are disposed may be divided into a plurality of blocks (sectors). In this case, candidates in the narrowed region R may be managed such that each candidate is associated with the corresponding one of the divided blocks (sectors). Each of the blocks (sectors) may have a rectangular parallelepiped shape. In this case, primary candidate sectors in the narrowed region R specified from among the respective candidates in the narrowed region R may be selected as secondary candidate sectors.

The present invention is not limited to the embodiment described herein.

For example, when communication quality between the HMD 12 and the relay device 16 does not reach predetermined quality even after completion of the processing depicted in S111 described above, the relay device 16 may check communication quality of communication in a main beam direction indicated by a primary candidate sector for all of the primary candidate sectors. In this case, the relay device 16 may determine, as a main beam direction of the relay device 16, a main beam direction indicated by primary candidate sector specified as a sector exhibiting the highest communication quality. Also in this case, primary candidate sectors not to be selected as secondary candidate sectors may be present, for example.

For example, the HMD 12 may include a plurality of antennas. In this case, the HMD 12 may control to drive only one or a plurality of the antennas selected in accordance with a communication path specified in the manner described above from among the plurality of antennas.

For example, a part of the functions illustrated in FIG. 6 by way of example may be implemented by the entertainment device 14. For example, the primary candidate sector data storage unit 70, the image acquiring unit 72, the communication path specifying unit 74, the narrowed region specifying unit 76, and the secondary candidate sector selecting unit 78 may be implemented by the entertainment device 14. In addition, the sector level sweep process executing unit 80 and the beam refinement process executing unit 82 may be implemented by the relay device 16. In this case, the entertainment device 14 may transmit, to the relay device 16, data indicating secondary candidate sectors selected by the secondary candidate sector selecting unit 78, for example. Thereafter, the relay device 16 may execute sector level sweep and beam refinement on the basis of the data indicating the secondary candidate sectors.

The HMD 12 may include a distance measurement device, such as a camera equipped with a fish-eye lens to image all or a part of directions around the HMD 12, and an infrared camera. In this case, the functions illustrated in FIG. 6 may be implemented by the HMD 12. According to this configuration, the image acquiring unit 72 may acquire an image captured by a camera included in the HMD 12, for example. Thereafter, the communication path specifying unit 74 may specify a communication path which passes through reflection on a reflection surface for communication between the HMD 12 and the relay device 16 on the basis of the image captured by the camera included in the HMD 12. In this case, the communication path specifying unit 74 specifies a main beam direction of the HMD 12.

Communication performed according to the present embodiment is not limited to communication utilizing millimeter waves. For example, the present embodiment is applicable to communication utilizing microwaves in a frequency band such as 5 GHz.

The specific character strings and numerical values described herein, and the specific character strings and numerical values in the figures are presented only by way of example. Other character strings and numerical values may be adopted in place of these specific character strings and numerical values.

The invention claimed is:

1. A communication path specifying device comprising:
an image acquiring unit that acquires an image of an environment where at least either a communication device or a communication partner of the communication device is disposed; and
a communication path specifying unit that specifies a sole communication path for communication between the communication device and the communication partner on the basis of the image,
wherein, if no shielding object is detected in the image between the communication device and the communication partner, a direct communication path is chosen as the sole communication path,
wherein, if a shielding object is detected in the image between the communication device and the communication partner, an indirect communication path is chosen as the sole communication path, the indirect communication path passing through reflection on a reflection surface, and
wherein the communication path specifying unit specifies the indirect communication path when communication quality of communication between the communication device and the communication partner is lower than a predetermined quality.

2. A head mounted display comprising:
an image acquiring unit that acquires an image of an environment where at least either the head mounted display or a communication partner of the head mounted display is disposed; and
a communication path specifying unit that specifies a sole communication path for communication between the head mounted display and the communication partner on the basis of the image, the communication path passing through reflection on a reflection surface,
wherein, if no shielding object is detected in the image between the communication partner and the head mounted display, a direct communication path is chosen as the sole communication path,
wherein, if a shielding object is detected in the image between the communication partner and the head mounted display, an indirect communication path is chosen as the sole communication path, the indirect communication path passing through reflection on a reflection surface, and
wherein the communication path specifying unit specifies the indirect communication path when communication quality of communication between the communication partner and the head mounted display is lower than a predetermined quality.

3. A communication path specifying method comprising:
acquiring an image of an environment where at least either a communication device or a communication partner of the communication device is disposed; and
specifying a sole communication path for communication between the communication device and the communication partner on the basis of the image, the communication path passing through reflection on a reflection surface,
wherein, if no shielding object is detected in the image between the communication device and the communication partner, a direct communication path is chosen as the sole communication path,
wherein, if a shielding object is detected in the image between the communication device and the communication partner, an indirect communication path is chosen as the sole communication path, the indirect communication path passing through reflection on a reflection surface, and wherein the communication path specifying unit specifies the indirect communication path when communication quality of communication between the communication device and the communication partner is lower than a predetermined quality.

4. The method of claim 3, wherein the indirect communication path is determined by selecting the reflection surface to be on an object having a smallest return loss.

5. The method of claim 3, wherein an angle of incidence equals an angle of reflection of reflection when the indirect communication path passes through reflection on the reflection surface.

* * * * *